Fig. 1.

No. 889,386. PATENTED JUNE 2, 1908.
W. B. MEHL.
STAFF LATHE.
APPLICATION FILED OCT. 9, 1906.

WITNESSES:
M. Van Nortwick
N. B. Smith

INVENTOR
Walter B. Mehl
BY George Cook
ATTORNEY

No. 889,386. PATENTED JUNE 2, 1908.
W. B. MEHL.
STAFF LATHE.
APPLICATION FILED OCT. 9, 1906.

WITNESSES
INVENTOR
Walter B. Mehl
BY
ATTORNEY ic
UNITED STATES PATENT OFFICE.

WALTER B. MEHL, OF WALTHAM, MASSACHUSETTS, ASSIGNOR TO E. HOWARD WATCH COMPANY, OF RIVERSIDE, NEW JERSEY, A CORPORATION OF NEW JERSEY.

STAFF-LATHE.

No. 889,386.   Specification of Letters Patent.   Patented June 2, 1908.

Application filed October 9, 1906. Serial No. 338,116.

*To all whom it may concern:*

Be it known that I, WALTER B. MEHL, a citizen of the United States, and a resident of Waltham, in the county of Middlesex and State of Massachusetts, have made and invented certain new and useful Improvements in Staff-Lathes, of which the following is a specification.

My invention relates to an improvement in machines for turning pinions, staffs and arbors, used in watches, clocks and other like mechanism. In staff lathes as now ordinarily constructed, it is necessary to remove the article from the machine after making the first cut or forming the first diameter, to then re-adjust the machine, again insert the article, and by the second cut to form the second diameter; then to remove the article, re-adjust the machine, and by the third cut, form the third diameter, and so on until each diameter has been formed on one half of the pinion, arbor or staff. The article is then removed from the machine and reversed end to end, and the several diameters formed on the second half of the article, the latter being removed and the machine re-adjusted after each cut, so that in the event that three shoulders and diameters are to be cut on each half of the pinion, it is necessary to remove the pinion from the machine and re-adjust the parts of the latter, five times during the completion of the pinion.

The object of my present invention is to so construct and arrange the machine that the pinion will have to be removed from the the lathe but once, that is, each half of the pinion will be fully completed without re-adjustment of the machine, and without removal from the machine, the only time that such removal becomes necessary being for the reversal of the pinion in the lathe, that is, from end to end. In other words, after the pinion has been inserted in the lathe, one half thereof is completed, the pinion then removed and reversed end to end in the machine, and the second half completed, this regardless of the number of shoulders and diameters to be formed on the pinion.

A further object of my invention is to so construct and arrange the several parts of the machine that if desired, the pinion may be traversed by the cutting tool the second time, the first operation being that of a heavy cut, to bring the pinion to approximately the proper size or diameter; the second operation, that of a finishing cut, to bring the pinion to exactly the proper size or diameter, these two cutting operations being performed, of course, without the necessity of removing the pinion from the lathe.

A further object of my invention is to so construct the machine that the several turnings or diameters on the pinion will be absolutely concentric, and thereby avoid the imperfections present in those pinions made on lathes of ordinary construction, and which imperfections arise by reason of the repeated removals and insertions of the pinion from and into the lathe, and the re-adjustment of the latter.

With these and other ends in view, my invention consists in certain novel features of construction and combinations of parts, as will be hereinafter fully described and specifically pointed out in the claims.

In the accompanying drawings.

Referring to the drawings, A represents a shelf, table, bench or other convenient support for the machine, the latter comprising a bed B on or to which is secured the frame C. This frame is provided with the lateral groove or recess in which reciprocates the slide D. Over and above the slide D is located the slide F, moving on the base E, forming a part of the slide D, at right angles thereto, said upper slide F carrying the cutting tool G. To the frame C is secured the tail and head-stock H, in which are mounted the spindles $h$ for carrying the pinion, staff, arbor, or other article under operation. By means of the several adjusting screws $a$, the position of the slides and several other portions of the machine may be adjusted.

The several parts above referred to, constitute a part or portion of the well known machine ordinarily used for cutting or turning pinions, arbors and staffs, and as a number of such machines are in daily use and well known and understood by those skilled in the art, and as such form no part of the present invention, no further detailed description thereof is necessary.

Figures 7, 8, 9, 10, 11, 12, 13:
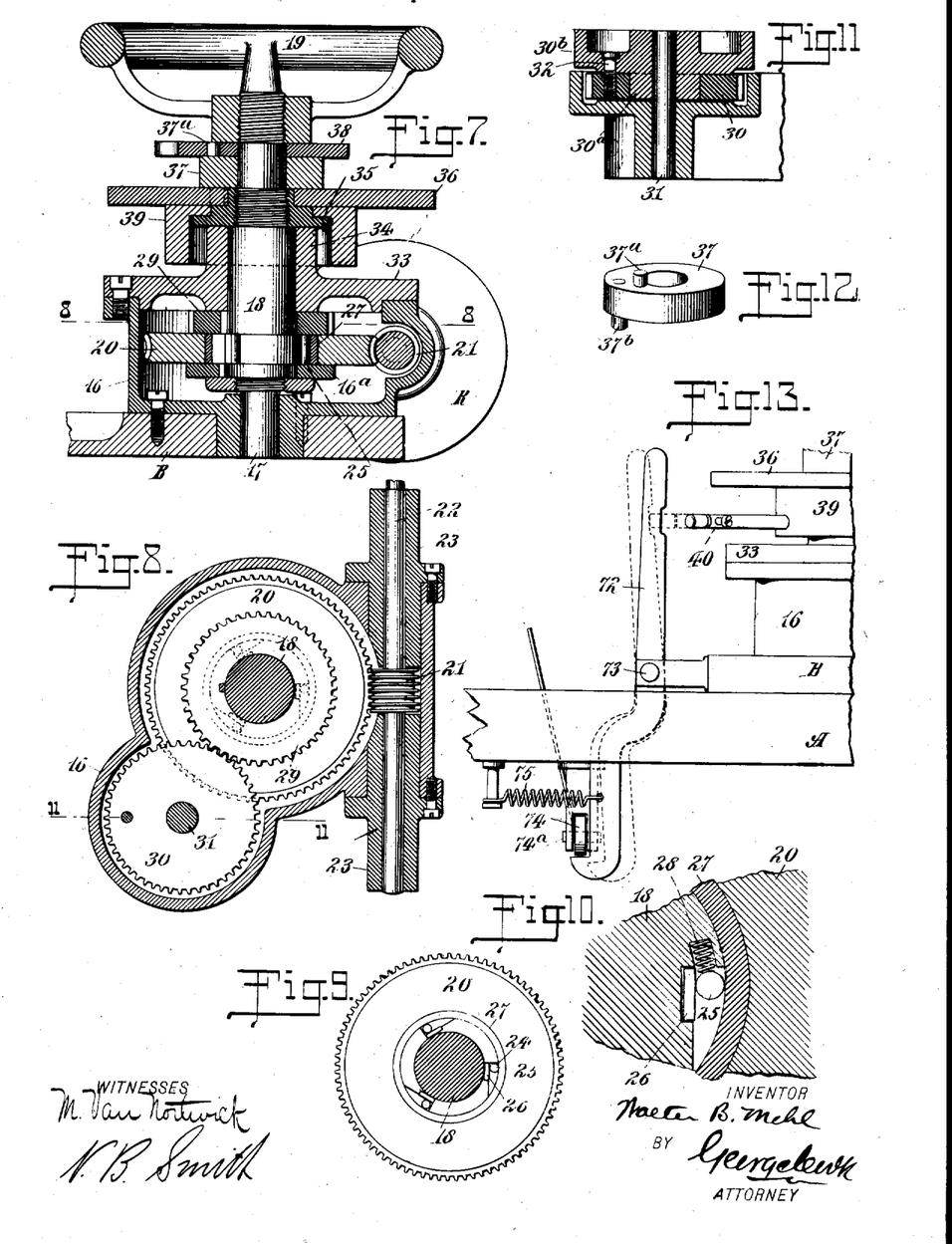
Fig. 7 is a sectional view showing the construction and arrangement of cams and cam shaft, and means for driving the latter.
Fig. 8 is a sectional view taken on the line 8—8 of Fig. 7.
Fig. 9 is a detached view of the worm gear, showing the roller-clutch applied thereto for locking said gear to the cam shaft.
Fig. 10 is an enlarged detail view of the clutch.
Fig. 11 is a sectional view taken on the line 11—11 of Fig. 8.
Fig. 12 is a detached perspective view of the collar fitting around the cam shaft, and employed for the purpose of holding the cams in their proper relative positions.
Fig. 13 is a detached view of the belt shifting mechanism.

To the bed of the machine B, is secured the box-like frame 16, as illustrated in Fig. 7, in the bottom or base of which is journaled the lower end 17 of the cam shaft 18, the upper end of the latter being provided with the hand wheel 19 for facilitating the turning thereof when necessary.

Within the box or casing 16, and resting upon the collar $16^a$, is the worm gear 20, meshing with the worm 21 secured on the shaft 22, the latter extending parallel to the base of the machine and journaled in the bearings 23, which bearings are bolted or otherwise secured within the casing 16, as illustrated in Figs. 7 and 8.

For the purpose of engaging the worm gear 20 with the cam shaft 18, I employ roller clutches 24, as illustrated in Figs. 9 and 10, wherein the rollers 25 are employed between said worm gear and shaft for tightly binding the latter to the former, hardened steel plates 26 being located within recesses formed in the shaft to afford a bearing for said rollers 25, the worm gear 20 being provided with a hardened steel ring 27 for forming the outer contact with the rollers 25, this construction and arrangement being preferred in order that said rollers, when in operative engagement with the shaft, shall be prevented from making grooves or indentations in the soft metal of which said shaft and gear are made.

Behind the rollers 25 are located the coiled springs 28, in order to retain said rollers in operative engagement with the shaft and gear.

By means of this construction and arrangement of parts, it will be understood that when motion is imparted to the worm gear 20 through the worm 21, the clutch will be in operative engagement, and that also when desired, the cam shaft 18 may be rotated in the same direction independently of the worm 21, by means of the hand wheel 19.

To the cam shaft 18 is secured the spur gear 29, meshing with a similar gear 30 mounted on the hub $30^a$ of the cam $30^b$, the latter being rotatably mounted on the stud 31 extending upwardly from the bottom of the casing 16, as illustrated in Fig. 11 of the drawings, said cam being secured to the spur gear 30 by means of the screw 32, causing said cam and gear 30 to rotate together.

To the casing 16 is fastened the cap 33, provided with the sleeve 34 forming a bearing for the cam shaft 18, and on the upper side of which sleeve rests the nut 35 threaded on the shaft 18 and fitting in an opening formed in the cam 36. For the purpose of holding the cam in position, I employ the collar 37 above and on which is located the cam 38, the latter being held in position by the hand wheel 19 threaded on the shaft 18. On the nut 35 is fitted a collar 39, provided with a finger 40, the purpose and function of which will be hereinafter described.

On the upper side or surface of the collar 37, is provided the pin or projection $37^a$, as illustrated in Fig. 12, and on the under side of said collar is formed a pin or projection $37^b$, the former of which pins fits in an opening in the cam 38, and the lower of which pins fits in a hole or opening in the cam 36, and extends downwardly into a hole or opening formed in the nut 35, the purpose and result of which is to hold or retain the several cams in their proper relative positions.

With the periphery of the upper cam 38, engages the free end of the cam lever 41, fulcrumed on an eccentric sleeve 42 formed on one end of the shifting lever 43, said lever 43 in turn, being pivoted to a bracket 44, secured to the frame of the machine by means of the screws or bolts 45.

Figure 4:
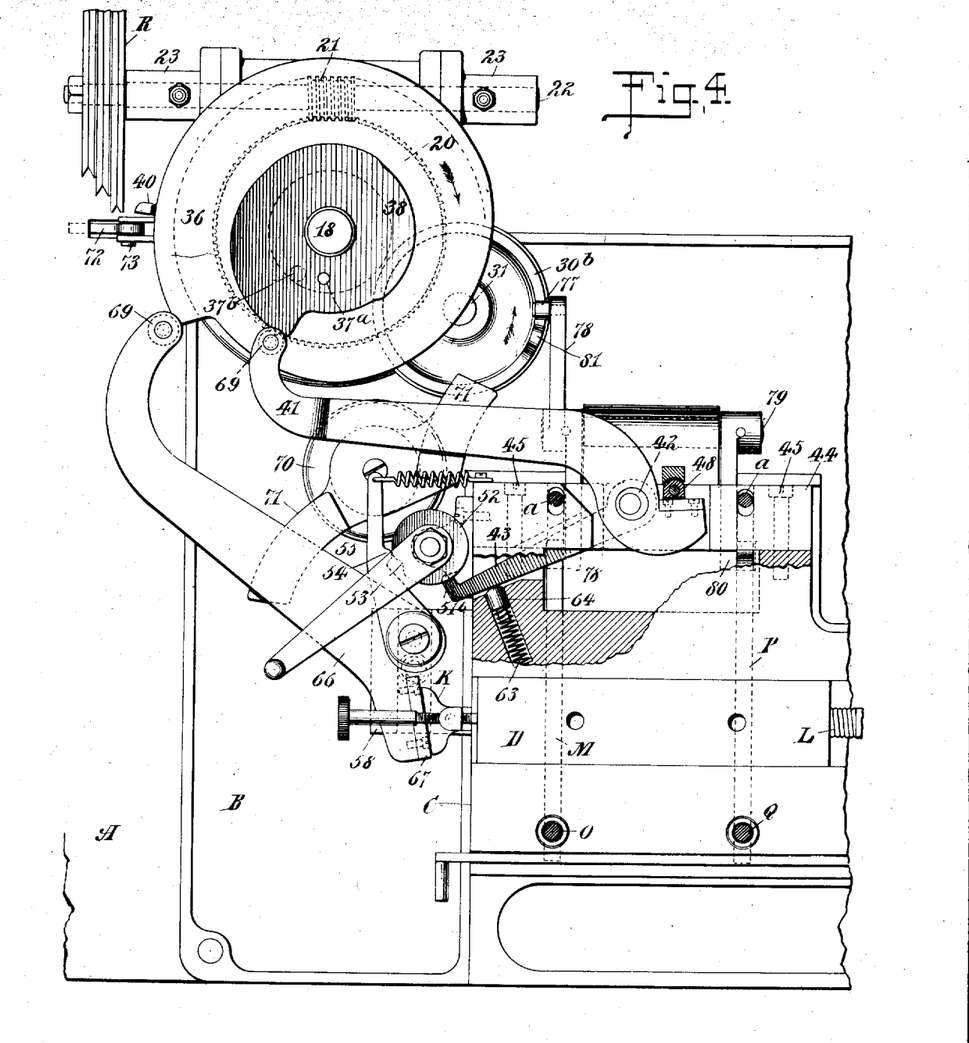
Fig. 4 is a plan view of the machine having one of the slides removed, and a portion of the bed broken away.

On the frame of the machine is located the slide J adapted to move in a direction parallel with the slide F, such slide J forming part of the ordinary machine, and to which is secured by means of the screw 46, a bracket 47. To the bracket 47 is secured the swiveling shoe 48, with which engages the extreme end of the lever 41, as illustrated in Fig. 4 of the drawings.

By means of this construction and arrangement of the several parts, it will be understood that when the free end of the cam lever 41 is moved outwardly by means of the cam 38, the opposite extreme end will be moved inwardly, which, engaging with the swiveling shoe 48, will, through the bracket 47 and slide J, operate to move the slide F in the same direction in which the slide J is moved. The slide F is arranged to be moved in the opposite direction by means of springs, constituting part of the ordinary machine, and constructed and arranged in the usual and well known manner, and which retain the end of the lever 41 in engagement with the periphery of the cam 38.

Figure 5:
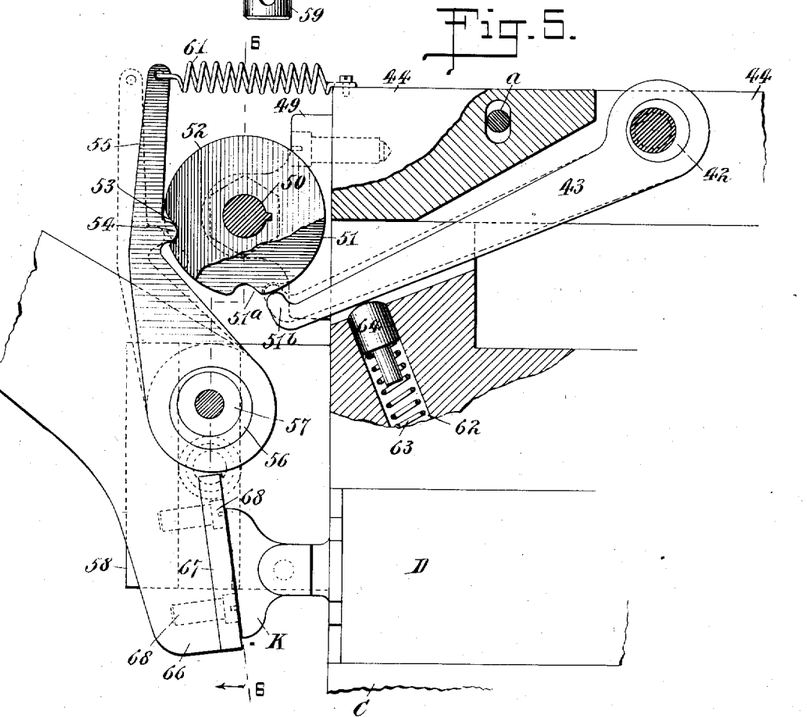
Fig. 5 is an enlarged detail view of one portion of the machine, showing the cam and levers for holding the several parts in their different adjustments.

As illustrated in Fig. 5, to the frame of the machine is bolted, or otherwise secured, the bracket 49, in which is journaled the shaft 50, having keyed thereon the cams 51-52. With the periphery of the lower cam 51, provided with the recess or depression 51$^a$, engages the bent free end 51$^b$ of the lever 43, which as before stated, is pivoted to the bracket 44. As the cam 51 is shifted, the bent end 51$^b$ of the lever 43 is moved into or out of the recess or depression 51$^a$, thereby causing, by means of the eccentric sleeve bearing 42 thereon, a change in the location of the fulcrum of the lever 41, and, through the means already referred to, a slight change in the position of the slide F, the distance moved by said slide F, being equal to the depth of the finishing cut on the pinion, arbor or staff under operation.

In Fig. 5 of the drawings, the lever 43 is shown as having its bent end engaging the concentric periphery of the cam 51, the dotted lines illustrating the position of the several parts after said cam has been shifted and the free bent end of said lever 43 allowed to project into the depression 51$^a$.

Figure 1:
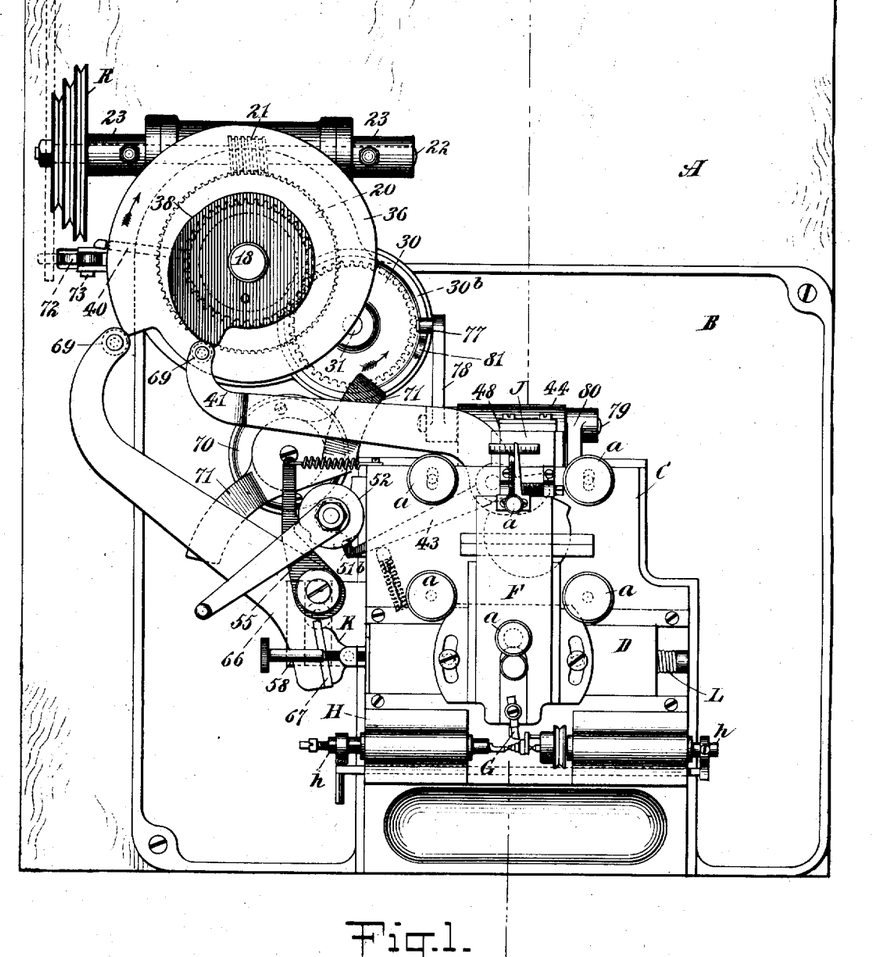
Figure 1 is a plan view of the machine.
Figure 2:
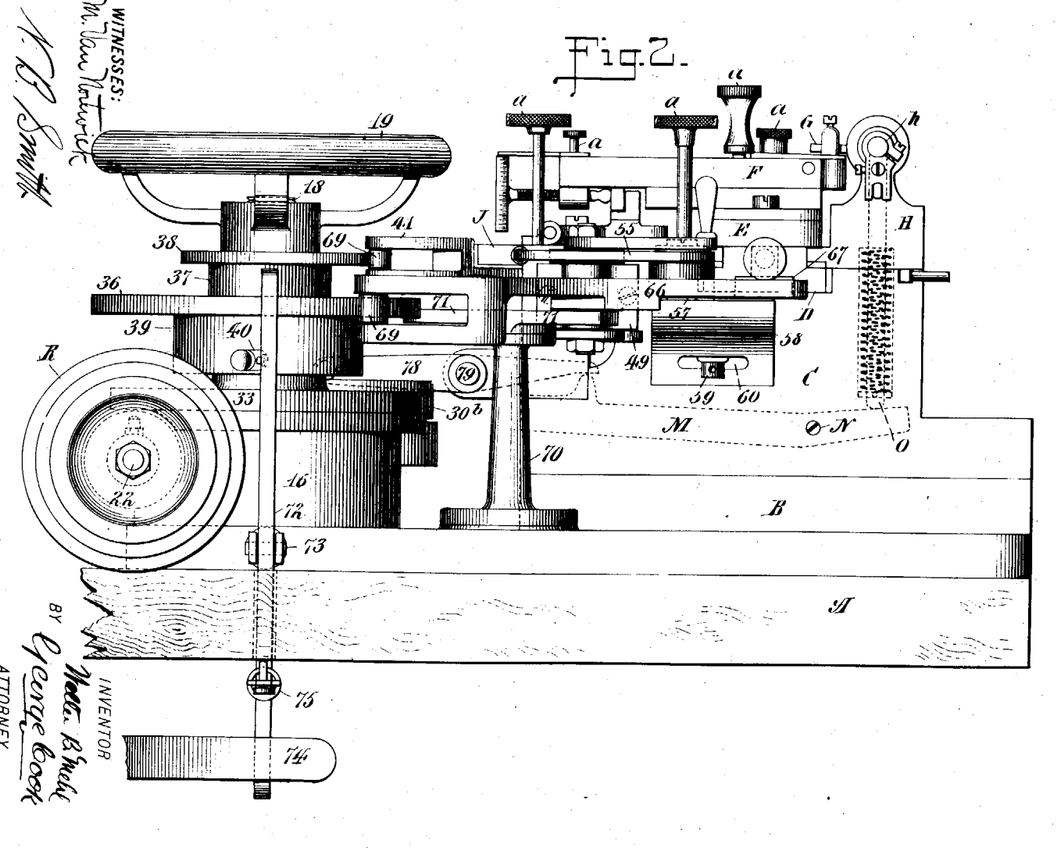
Fig. 2 is a view in side elevation thereof.

When the parts are in the position as illustrated in full lines in Fig. 5, the slide F with its attached cutter, will be in proper position or adjustment for effecting the first or heavy cut on the pinion or arbor. In Fig. 1, however, the lever 43 is shown as having its bent end projecting into the recess 51$^a$ of the cam 51, in which position the slide F with its attached cutter, will effect the second or finishing cut on said pinion, staff or arbor.

In the frame of the machine is formed a hole or opening 62, in which is located a spring 63 on which latter in turn rests the plunger 64, said plunger being held by the tension of said spring in contact with the lever 43; the tendency of this spring is to retain the bent end 51$^b$ of said lever 43 in contact with the periphery of the cam 51, and when said cam is shifted as described, to force said bent end into the depression 51$^a$.

Figure 6:
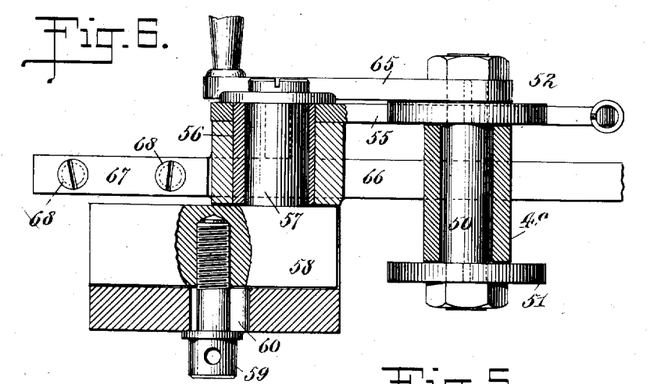
Fig. 6 is a sectional view taken on the line 6—6 of Fig. 5, and looking in the direction of the arrow.

With the periphery of the upper cam 52, provided with the depression 53, engages the projection 54 formed on the lever 55, one end of which is provided with an eccentric sleeve 56, journaled about a stud 57 formed on or secured to the block 58, adjustably secured to the frame of the machine by the bolt 59, passing through the elongated slot 60 formed in said frame, as illustrated in Figs. 5 and 6.

To the opposite end of the lever 55 is secured one end of the spring 61, the opposite end of the spring being secured to the bracket 44, the tendency of said spring being to keep the projection 54 formed on the lever 55, in engagement or contact with the periphery of the cam 52. As the cam 52 is shifted or rotated with the shaft 50, the projection 54 is caused to ride out of the recess 53, and when returned to its normal position, the tendency of the spring 61 will be to cause said projection 54 on the lever 55 to enter the recess 53, as illustrated in Fig. 5, the several cams and levers being so arranged that when the pinion, staff or arbor is being first cut, the projection 54 on the lever 55 will rest within the depression 53, while the free bent end 51$^b$ of the lever 43 will rest on the concentric periphery of the cam 51. When these cams are shifted, however, to effect the finishing cut, the projection 54 will ride out of the depression 53 formed in the periphery of the cam 52, as illustrated in dotted lines in Fig. 5, and the free bent end 51$^b$ of the lever 43 will ride into the depression 51$^a$ formed in the periphery of the cam 51, as illustrated in dotted lines in said Fig. 5.

In order to move the cams 51 and 52, which are of course shifted simultaneously, I provide a handle or lever 65, secured to one end of the shaft 50, to which said cams are attached.

To the slide D is pivoted the swiveling shoe K forming part of the ordinary machine, and against which shoe bears the extreme end of the lever 66, this end of the lever being provided with the hardened steel contact plate 67 secured to said lever by means of the screws 68, as illustrated in Fig. 5 of the drawings, said lever 66 being fulcrumed on the eccentric sleeve 56 formed on or secured to the lever 55, as before described. The opposite free end of the lever 66, as illustrated in Fig. 4, engages the periphery of the cam 36, both of said levers 41 and 66 employed to operate or move the slides F and D, respectively, being provided with rollers 69, in order to reduce the frictional contact of their free ends with the peripheries of their respective cams.

To support the weight of the levers 41 and 66, I provide the post or pedestal 70, the lower end of which is secured to the bed or frame of the machine, and the upper end provided with outwardly extending arms 71, on which said levers rest as indicated in the several figures of the drawings. As the cam 36 is shifted or rotated, the free end of the lever 66 is moved outwardly, as illustrated in Fig. 1, and the opposite extreme end thereof moved inwardly, which in turn bearing against the swiveling shoe K, connected with the slide D, moves the latter in a corresponding direction. Bearing against the opposite end of the slide D is the spring L, forming a part of the ordinary machine, the tendency of which spring is to return said slide in a direction opposite to that caused by the lever 66, and retain the free end of said lever 66 in contact with the periphery of the cam 36.

When the cam 52 is shifted from the position as illustrated for instance in Fig. 5, the projection 54 on the lever 55 is caused to ride up out of the depression 53 onto the periphery of the cam 52, and by reason of the fact that the lever 66 is mounted or fulcrumed on the eccentric sleeve 56 formed on or secured to the lever 55, the fulcrum of the lever 66 is changed or altered as in the case of the lever 41 before described.

From the foregoing it will be understood that when the shaft 50 is partially turned or rotated by means of the handle or lever 65, both cams 51 and 52 are also partially rotated, thereby changing the fulcrums of the levers 41 and 66 with relation to the slides F and D, forcing each of said slides a slight distance forward when changing the levers from the normal positions as illustrated in Fig. 5, to the positions as illustrated in Fig. 4, the several springs hereinbefore referred to, causing the respective slides to return to their normal positions as illustrated in Fig. 5 when the handle or lever 65 is returned to its normal position.

To automatically stop the machine after completing one revolution of the cams 36 and 38, I employ the finger 40 formed on or secured to the collar 39, hereinbefore referred to, the outer end of said finger engaging with the lever 72 fulcrumed to a stud 73 formed on or secured to the bed B of the machine, as illustrated in Fig. 13 of the drawings.

When the lower end of the lever 72 is moved outwardly, as illustrated in dotted lines, the extreme lower end thereof is released from engagement with the end of the lever 74, fulcrumed at 74$^a$, the opposite end of which latter is adapted to shift the belt from a tight to a loose pulley. When the finger 40 passes the lever 72, the latter is returned to its normal position by means of the spring 75, one end of which is connected with the lower end of said lever 72 and the opposite end to a pin or stud secured to the bench or table A. This tripping mechanism, of course, may be modified or altered as desired, and forms no part of my invention, some form thereof being used for the purpose of automatically stopping the machine after the cams 36 and 38 have made one complete revolution.

Figure 3:
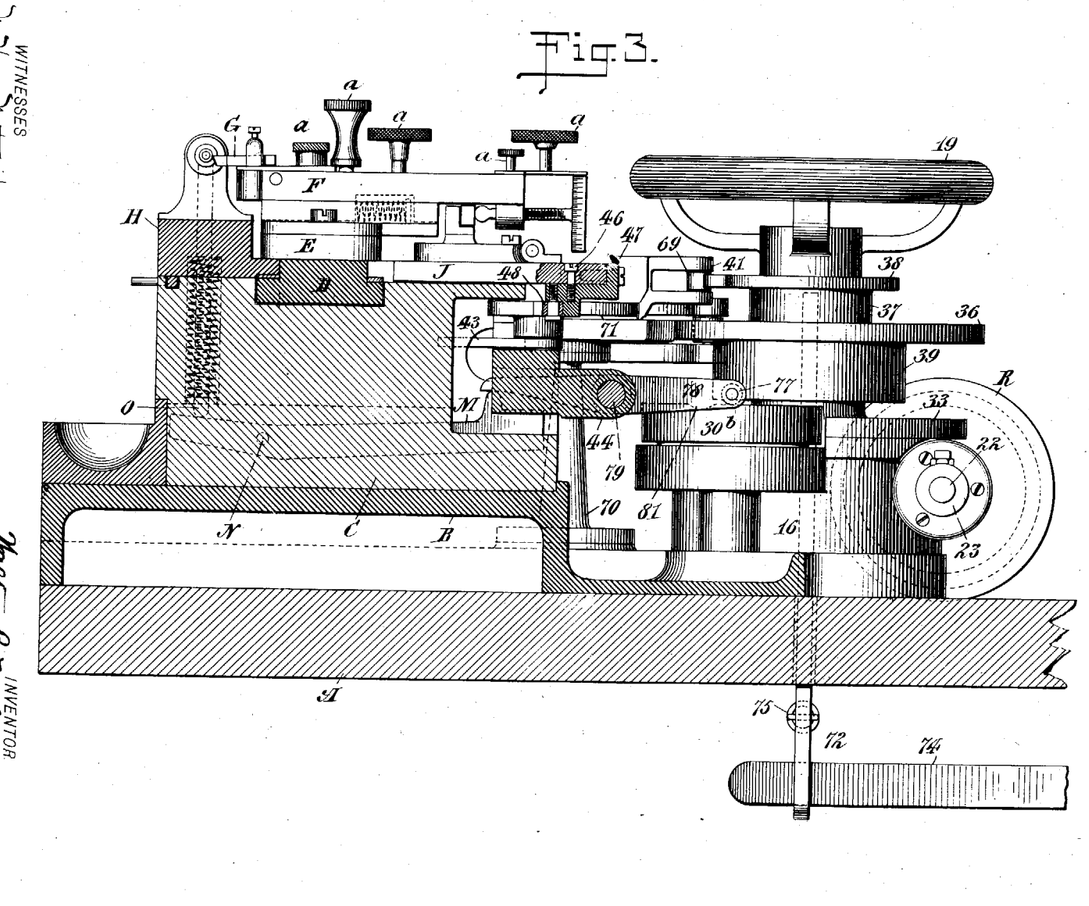
Fig. 3 is a sectional view taken on the line 3—3 of Fig. 1.

On the upper or cam edge of the cam 30$^b$, engages a roll or trunnion 77 secured to one end of the lever 78, which lever is fulcrumed and pinned tightly to the shaft 79, the opposite end of said lever 78 engaging with one end of the lever M, which in turn is fulcrumed at N in the frame of the machine, as illustrated in Fig. 3. On the opposite end of the lever M rests one end of the spring actuated plunger O, the upper end of said plunger engaging with one of the spindles $h$ as in the case of the ordinary machine for binding said spindle $h$ against lateral movement when the cut is being made on the arbor or staff. On the opposite end of the shaft 79 is pinned or otherwise secured, the lever 80, the free end of which engages one end of the lever P also fulcrumed in the frame of the machine in a similar manner to the lever M, before described, and also engaging with a spring actuated plunger Q, which latter in turn engages with the other of said spindles $h$ to hold the same against lateral movement while the arbor or staff is under operation.

As in the case of the machine as ordinarily constructed, when the roller or trunnion 77 rides into the depression 81 formed in the cam 30$^b$, the spindles $h$ are released from engagement with the plungers O, Q, and allowed lateral movement in their bearings, and when said trunnion rides out of said depression on said cam 30$^b$, the plungers are raised into engagement with the spindles and hold the same tightly against endwise or lateral movement as hereinbefore described, the arbor or staff being thereby held stationary while the cut or cuts are being made thereon or therein by the tool G.

Motion is imparted to the machine through a belt passing over the pulley R secured to the end of the shaft 22, which through the worm 21 and worm gear 20, imparts its motion to the cam shaft 18, and through the latter to the cams 38, 36. As these cams rotate, the levers 41 and 66 cause the slides F and D to move in directions and to an extent as determined by the cam surfaces, thereby causing the cutting tool to travel in a corresponding direction, and to form the different diameters and shoulders on the pinion, arbor or staff under operation, the cam 38 and lever 41 actuating the slide F, and the cam 36 and lever 66 actuating the slide D.

When the cam 36 and lever 66 cause the slide D to travel laterally, the cutting tool G is caused to travel in a corresponding direction, as between shoulders on the pinion, and when the cam 38 and lever 41 actuate the slide F, the cutter is caused to move in a direction at right angles to the axis of the pinion until such time as the cam 36 and lever 66 again come into operation.

Figure 14:
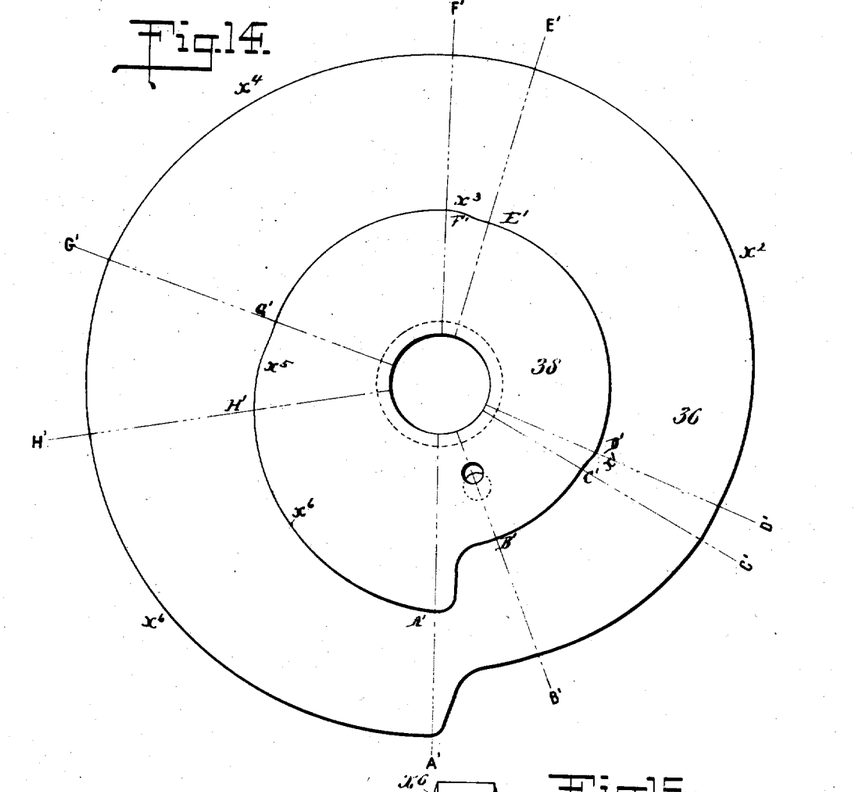
Fig. 14 is a plan view of the cams.
Figure 15:
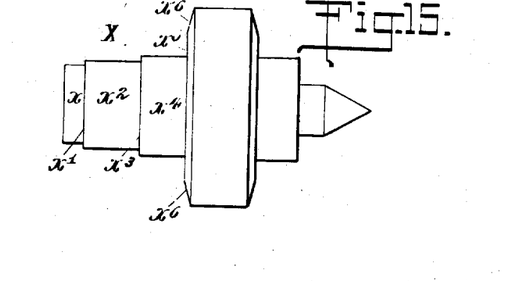
Fig. 15 is a view in side elevation of a pinion cut by cams having the outlines as shown in Fig. 14.

In Fig. 14 I have shown two cams having proper outlines, whereby to produce an arbor having the diameters and shoulders as illustrated in Fig. 15.

It will of course be understood, that the outlines or peripheries of the cams 36 and 38, are so varied, changed or altered as to correspond with the diameters and shoulders to be formed on the pinions or arbors, and are so arranged with relation to each other that while one cam with its respective lever is operating to move its respective slide, the other cam and lever with its respective slide is at rest. For instance, in forming the diameter $x$ on the pinion X, that portion of the periphery of the cam 38 between the points B' and C' is concentric while that portion of the periphery of the cam 36 between B' and C' is eccentric, causing the cutter to travel in a line parallel to the axis of the pinion. Between the points C' and D' on the periphery of the cam 38, there is an eccentric rise, causing the cutter to recede from the pinion, while the periphery of the cam 36 between the points C' and D' is concentric, thereby forming the shoulder $x'$ on the pinion. The cutter is next caused to travel parallel to the axis of the pinion by reason of the fact that between the points D' and E' on the periphery of the cam 36, there is an eccentric rise, while the periphery of the cam 38 between the points D' and E', is concentric, thereby forming the diameter $x^2$ on the pinion. Between the points E' and F' the cam 38 becomes active by reason of the eccentric rise on its periphery, and the cam 36 becomes inactive by reason of its concentric periphery between said points E' and F', thereby forming the shoulder $X^3$ on the pinion. Between the points F' and G' on the periphery of the cam 36, there is an eccentric rise causing the cutter to travel parallel with the axis of the pinion, forming the diameter $x^4$ thereon, the periphery of the cam 38 between said points F' and G' being concentric.

Between the points G' and H' on the cam 36, the periphery is concentric, while between the same points on the cam 38, there is an eccentric rise, forming the shoulder $x^5$ on the pinion.

Between the points H' and A' on the cam 36, there is an eccentric rise, and on the periphery of the cam 38 between said points H' and A', there is also an eccentric rise, which bring into simultaneous operation the two slides, whereby is produced the bevel $x^6$ on the pinion.

The tripping mechanism before described, then causes the belt to be shifted from the tight to the loose pulley, the momentum of the machine causing the cams to travel to a point about midway between the points A' and B' on the two cams 36 and 38, leaving one or both spindles $h$ released from engagement with the plungers O and Q, as before described, this release being caused by the trunnion 77 on the lever 78 riding into the depression 81 in the cam $30^b$.

By moving the handle or lever 65 and shifting the cams 51 and 52 as before described, the slides D and F are slightly moved forward, the machine is again started, and the same operation repeated, the cut, however, which is the finishing cut, being of less depth by reason of the change in the position of the slides, as hereinbefore fully described. The pinion, after having one-half thereof completed, may then be removed from the machine and reversed end to end, and if the diameters and shoulders are to correspond with those already formed on the first half, the same cams 36 and 38 may be allowed to remain in the machine. If, however, the diameters and shoulders on the second half of the pinion are of a different relation to those cut on the first half, the cams 36 and 38 are removed and other cams having proper outlines, substituted therefor.

From the foregoing it will be understood that any number of shoulders and diameters may be formed on a pinion or arbor, the relations between them being fixed or determined by the outlines or peripheries of the cams 36 and 38.

It will also be understood that by reason of the employment of cams to operate the several slides carrying the cutting tool, the necessity of removal of said pinion, arbor or staff from the machine, after each diameter or shoulder has been cut, is avoided; said pinion, arbor or staff being allowed to remain in its proper adjustment and position within the machine until one half thereof has been completed, thereby insuring the accurate concentric cuttings of its different diameters and proper relations of shoulders. Furthermore, my improved attachment permits of a first or heavy cut, and a second or finished cut, whereby absolute certainty in size of the several diameters is accomplished, and this without the necessity of removing the pinion from its first properly adjusted position within the machine, it being a well known fact that if one heavy cut be made, there is more or less danger of the pinion, arbor or staff being sprung or bent under the cutting strain. Furthermore, by reason of the ratio between the lengths of the longer and shorter arms of the levers 41 and 66, the distance traveled by the shorter arms of said levers is much less than that traveled by the longer arms thereof, the consequence being that should there be any error in the outlines of the peripheries of the cams 36 and 38, such errors in the finished product will be materially reduced; in fact, in those machines which I now have in operation, the ratio between the lengths of the longer and shorter arms of the lever 41 is approximately ten to one, so that should any error occur in the outline of the cam 38, such error in the finished product will be one-tenth of that occurring on the cam. The ratio existing between the length of the longer and shorter arms of the levers 66 is five to one, so that an error in the outline of the cam 36 will be reduced to approximately one-fifth of such error in the finished pinion or arbor.

Having fully described my invention, what I claim as new and desire to secure by Letters Patent, is:—

1. In a staff lathe, the combination with two slides placed one above the other and carrying a cutter and arranged to move independently of each other, of a cam lever engaging said slides and fulcrumed on an eccentric, and rotating cams engaging said lever for operating said slides, substantially as described.

2. In a staff lathe, the combination with two reciprocating slides placed one above the other and carrying a cutter and arranged to move independently of each other, of a cam lever engaging each of said slides and each fulcrumed on an eccentric, and rotating cams engaging said levers for operating said slides, substantially as described.

3. In a staff lathe, the combination with reciprocating slides placed one above the other and carrying a cutter and arranged to move independently of each other, of cam levers fulcrumed on eccentrics and having their shorter arms engaging with slides, and rotating cams engaging the longer arms of said levers for operating said slides, substantially as described.

4. In a staff lathe, the combination with reciprocating slides placed one above the other and carrying a cutter and arranged to move independently of each other, of cam levers mounted on movable fulcrums and engaging said slides, and rotating cams engaging said cam levers, substantially as described.

5. In a staff lathe, the combination with reciprocating slides placed one above the other and carrying a cutter and arranged to move independently of each other, of cam levers engaging said slides, shifting levers provided with eccentrics on which said cam levers are fulcrumed, rotating cams engaging said cam levers and means for operating said shifting levers, substantially as described.

6. In a staff lathe, the combination with spring actuated reciprocating slides placed one above the other and carrying a cutter and arranged to move independently of each other, of shifting levers, cam levers eccentrically fulcrumed on said shifting levers, cams engaging said shifting levers, and rotating cams engaging said cam levers for operating said slides, substantially as described.

7. In a staff lathe, the combination with two slides placed one above the other and carrying a cutter and arranged to move independently of each other, of cam levers for moving said slides in one direction, springs for moving said slides in the opposite direction, shifting levers provided with eccentrics on which said cam levers are fulcrumed, cams engaging said shifting levers, and means for moving said cams, and rotating cams engaging said cam levers for operating said slides, substantially as described.

Signed at New York, borough of Manhattan, in the county of New York, and State of New York, this 21st day of September, A. D. 1906.

WALTER B. MEHL.

Witnesses:
M. Van Nortwick,
N. B. Smith.